United States Patent
Li

(10) Patent No.: US 10,750,007 B2
(45) Date of Patent: Aug. 18, 2020

(54) METHOD AND DEVICE FOR PREVENTING TERMINAL FROM BEING INADVERTENTLY TOUCHED

(71) Applicant: Beijing Xiaomi Mobile Software Co., Ltd., Beijing (CN)

(72) Inventor: Guosheng Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 0 days.

(21) Appl. No.: 16/165,053

(22) Filed: Oct. 19, 2018

(65) Prior Publication Data

US 2019/0132441 A1    May 2, 2019

(30) Foreign Application Priority Data

Oct. 27, 2017 (CN) .......................... 2017 1 1023495

(51) Int. Cl.
*G06F 3/041* (2006.01)
*H04M 1/725* (2006.01)
(Continued)

(52) U.S. Cl.
CPC ...... *H04M 1/72577* (2013.01); *G06F 1/1613* (2013.01); *G06F 1/1643* (2013.01);
(Continued)

(58) Field of Classification Search
CPC .......... G06F 19/00; G06F 16/00; G06F 3/016; G06F 3/017; G06F 3/041
See application file for complete search history.

(56) References Cited

U.S. PATENT DOCUMENTS

| | | | | |
|---|---|---|---|---|
| 6,141,604 A | * | 10/2000 | Mattes | B60R 21/013 701/1 |
| 2007/0156364 A1 | * | 7/2007 | Rothkopf | G06F 1/1684 702/117 |

(Continued)

FOREIGN PATENT DOCUMENTS

| CN | 101626424 A | 1/2010 |
|---|---|---|
| CN | 102006356 A | 4/2011 |

(Continued)

OTHER PUBLICATIONS

Extended Search Report for European Application No. 18202659.1 from the European Patent Office, dated Feb. 19, 2019.

(Continued)

*Primary Examiner* — Olga V Merkoulova
(74) *Attorney, Agent, or Firm* — Finnegan, Henderson, Farabow, Garrett & Dunner, L.L.P.

(57) ABSTRACT

The present disclosure provides a method and device for preventing a terminal from being inadvertently touched. The method includes: brightness of ambient light is acquired; a body posture of the terminal is determined when the brightness of the ambient light is less than a brightness threshold; and a touch-disable mode is activated when the body posture of the terminal is an inverted posture. In the present disclosure, when the brightness of the ambient light is less than the brightness threshold and the body posture of the terminal is an inverted posture, it is determined that the terminal is in a pocket of a user and the touch-disable mode is activated.

13 Claims, 6 Drawing Sheets

(51) Int. Cl.
*G06F 1/16* (2006.01)
*G06F 3/0488* (2013.01)
*H04M 1/67* (2006.01)

(52) U.S. Cl.
CPC .......... *G06F 1/1684* (2013.01); *G06F 3/0416* (2013.01); *G06F 3/0488* (2013.01); *H04M 1/72569* (2013.01); *G06F 2200/1637* (2013.01); *H04M 1/67* (2013.01); *H04M 2250/12* (2013.01)

(56) References Cited

U.S. PATENT DOCUMENTS

| | | | |
|---|---|---|---|
| 2010/0225582 A1* | 9/2010 | Ohta | A63F 13/02 345/158 |
| 2011/0116201 A1 | 5/2011 | Rothkopf | |
| 2011/0306304 A1 | 12/2011 | Forutanpour et al. | |
| 2012/0002430 A1* | 1/2012 | Yamazaki | B60Q 1/10 362/464 |
| 2012/0023060 A1 | 1/2012 | Rothkopf | |
| 2012/0154294 A1* | 6/2012 | Hinckley | G06F 1/1649 345/173 |
| 2012/0265482 A1 | 10/2012 | Grokop et al. | |
| 2013/0169067 A1 | 7/2013 | Rothkopf | |
| 2014/0120891 A1* | 5/2014 | Chen | G06F 3/0487 455/418 |
| 2014/0129170 A1* | 5/2014 | Ramachandran | G01P 21/00 702/93 |
| 2014/0197698 A1 | 7/2014 | Rothkopf | |
| 2014/0221051 A1 | 8/2014 | Oguri | |
| 2015/0160780 A1 | 6/2015 | Park | |
| 2015/0227835 A1 | 8/2015 | Rothkopf | |
| 2016/0328248 A1 | 11/2016 | Rothkopf | |
| 2017/0085565 A1 | 3/2017 | Sheller et al. | |
| 2017/0228242 A1 | 8/2017 | Rothkopf | |
| 2017/0256144 A1 | 9/2017 | Khoshkava et al. | |
| 2018/0067757 A1 | 3/2018 | Rothkopf | |
| 2018/0130320 A1 | 5/2018 | Khoshkava et al. | |
| 2018/0359247 A1 | 12/2018 | Sheller et al. | |

FOREIGN PATENT DOCUMENTS

| | | |
|---|---|---|
| CN | 102546916 A | 7/2012 |
| CN | 104541231 A | 4/2015 |
| CN | 104601808 A | 5/2015 |
| CN | 104715736 A | 6/2015 |
| CN | 105573632 A | 5/2016 |
| CN | 106200878 A | 12/2016 |
| CN | 106911863 A | 6/2017 |
| CN | 107786743 A | 3/2018 |
| EP | 2759906 A1 | 7/2014 |
| EP | 3217269 A1 | 9/2017 |
| JP | 2009272996 A | 11/2009 |
| JP | 2014127089 A | 7/2014 |
| KR | 20150067676 A | 6/2015 |
| RU | 2014151406 A | 8/2016 |
| WO | WO 2015125373 A1 | 8/2015 |

OTHER PUBLICATIONS

English version of International Search Report of PCT Application No. PCT/CN2018/100854, dated Nov. 6, 2018, issued by the ISA/CN—State Intellectual Property Office of the P.R. China.
Second Office Action of the Chinese Application No. 201711023495.X dated Dec. 13, 2019.
First Office Action of the Japanese Application No. 2018-562260 dated Dec. 6, 2019.
Notice of Allowance of the Russian Application No. 2019109566 dated Jan. 30, 2020.
First Office Action of Korean Application No. 10-2019-7006573, dated Feb. 20, 2020.
Decision of Refusal of Japanese Application No. 2018-562260, dated Mar. 17, 2020.

* cited by examiner

METHOD AND DEVICE FOR PREVENTING TERMINAL FROM BEING INADVERTENTLY TOUCHED

CROSS-REFERENCE TO RELATED APPLICATIONS

This application is based upon and claims the benefit of priority from Chinese Patent Application No. 201711023495.X, filed on Oct. 27, 2017, the contents of which are hereby incorporated by reference in its entirety.

TECHNICAL FILED

The present disclosure generally relates to the field of human-computer interactions, and in particular, to a method and device for preventing a terminal from being inadvertently touched.

BACKGROUND

Conventionally, a terminal, such as a mobile phone, may have a touch display screen. The touch display screen can be used to display a user interface and can also be used to receive a touch operation of a user.

In order to reduce the possibility that the touch display screen is inadvertently touched, a method for preventing a terminal from being inadvertently touched is provided in the related art. A distance sensor is provided on a front panel of a terminal and detects a distance between an external object and the front panel of the terminal. The display screen of the terminal is set to an off-screen state when the distance is less than a predetermined threshold.

SUMMARY

The present disclosure provides a method and device for preventing a terminal from being inadvertently touched when no distance sensor is provided in the terminal. The technical solution is as follows.

According to a first aspect of embodiments of the present disclosure, there is provided a method for preventing a terminal from being inadvertently touched. The method may include that brightness of ambient light is acquired; a body posture of the terminal is determined when the brightness of the ambient light is less than a brightness threshold; and a touch-disable mode is activated when the body posture of the terminal is an inverted posture.

According to a second aspect of the present disclosure, there is provided a device for preventing a terminal from being inadvertently touched. The device may include a processor and a memory configured to store an instruction executable by the processor. The processor is configured to acquire brightness of ambient light; determine a body posture of the terminal when the brightness of the ambient light is less than a brightness threshold; and activate a touch-disable mode when the body posture of the terminal is an inverted posture.

According to a third aspect of the present disclosure, there is provided a non-transitory computer-readable storage medium storing at least one instruction that, when executed by the processor, cause the processor to perform the above noted method for preventing a terminal from being inadvertently touched.

It will be appreciated that the above general description and the following detailed description are merely exemplary and are not intended to be limit the present disclosure.

BRIEF DESCRIPTION OF DRAWINGS

The accompanying drawings, which are incorporated in and constitute a part of the specification, illustrate embodiments consistent with the present disclosure and serve to explain the principles of the present disclosure together with the specification.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the present disclosure. Instead, they are merely examples of devices and methods consistent with some aspects related to the present disclosure as detailed in the appended claims.

With the development of technologies, a screen-to-body ratio of a terminal is getting larger, and not only a curved screen but also a full screen appears. As the screen-to-body ratio is getting larger, a distance sensor located on a front panel of the terminal is gradually removed. After the distance sensor is removed, it may be difficult to prevent the terminal from being inadvertently touched based on the distance sensor, as described above. The present disclosure provides a solution for accurately preventing the terminal from being inadvertently touched without requiring a distance sensor.

For example, the terminal is a mobile phone. The terminal can be prevented from being inadvertently touched if a touch-disable mode is activated in time when the terminal is in a pocket of a user (such as a pocket of a trouser). On one hand, since a length of the terminal may be greater than a width of the pocket of the user, the terminal in the pocket will not be in a horizontal state; on the other hand, since a top of the terminal is generally put into the pocket firstly after the user uses the terminal, the terminal will be in an inverted posture in the pocket of the user.

Figure 1:
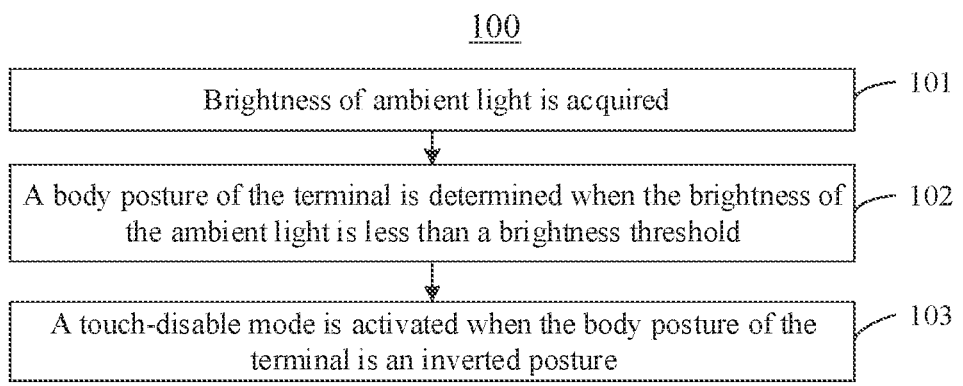
FIG. 1 illustrates a flowchart of a method for preventing a terminal from being inadvertently touched according to an exemplary embodiment.

FIG. 1 illustrates a flowchart of a method 100 for preventing a terminal from being inadvertently touched according to an exemplary embodiment. The method 100 can be applied to a terminal, and includes the following operations.

At block 101, brightness of ambient light is acquired.

For example, a light sensor may be provided in the terminal, and the brightness of the ambient light can be acquired by the light sensor.

At block 102, a body posture of the terminal is determined when the brightness of the ambient light is less than a brightness threshold.

In the exemplary embodiment, the body posture of the terminal is further determined by the terminal when the brightness of the ambient light is relatively dark. For example, if an accelerator sensor is provided in the terminal, the terminal can determine the body posture of the terminal by the accelerator sensor.

At block 103, a touch-disable mode is activated when the body posture of the terminal is an inverted posture.

For example, the touch-disable mode includes that a predetermined component is set to a non-operating state; or when receiving a signal reported by a predetermined component, no response is made to the signal.

In the exemplary embodiment, the predetermined component includes at least one of a physical button, a virtual button, a fingerprint sensor, a pressure sensor, an edge touch sensor, a touch display screen, or a camera.

In the method 100, when the brightness of the ambient light is less than the brightness threshold and the body posture of the terminal is the inverted posture, it is determined that the terminal is in a pocket of a user and the touch-disable mode is activated. Thus, when no distance sensor is provided in the terminal, a light sensor and an acceleration sensor in a terminal can be used to recognize a pocket scene accurately and the touch-disable mode is activated accurately.

Figure 2:
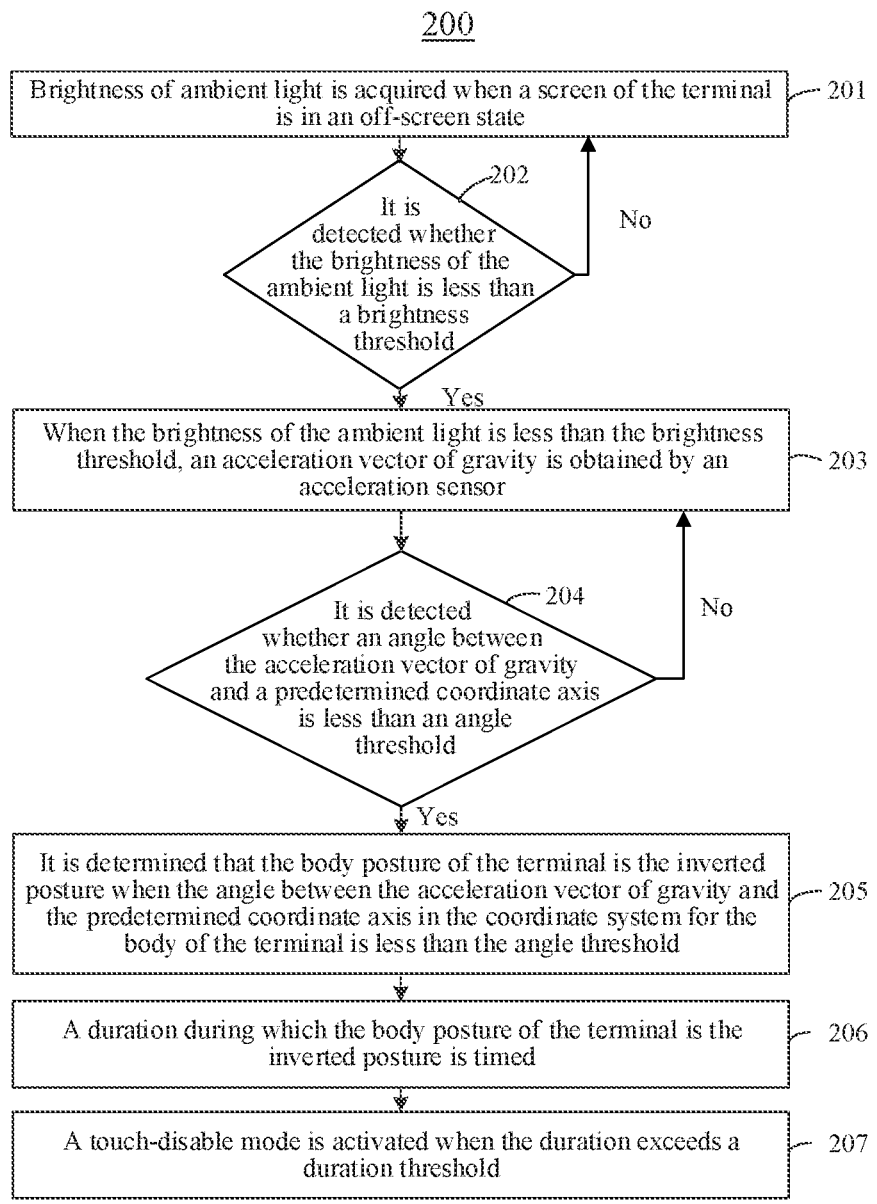
FIG. 2 illustrates a flowchart of a method for preventing a terminal from being inadvertently touched according to another exemplary embodiment.

FIG. 2 illustrates a flowchart of a method 200 for preventing a terminal from being inadvertently touched according to another exemplary embodiment. The method 200 can be applied to a terminal, and includes the following operations.

At block 201, brightness of ambient light is acquired when a screen of the terminal is in an off-screen state.

In the exemplary embodiment, a user sets a terminal to a sleep mode when the user does not use the terminal. For example, the user presses a shutdown button, so that the screen of the terminal is in the off-screen state.

Also for example, in the off-screen state, the terminal enters a pocket detection mode. The terminal may acquire the brightness of the ambient light every predetermined time interval.

In the exemplary embodiment, a light sensor is provided on a body of the terminal. The light sensor is generally provided on a front panel of the body of the terminal. The terminal acquires the brightness of the ambient light by the light sensor.

In some embodiments, if the light sensor is not provided in the terminal, the terminal may acquire the brightness of the ambient light by a camera.

At block 202, it is detected whether the brightness of the ambient light is less than a brightness threshold.

For example, the brightness threshold is a preset value, such as 11 lux. The terminal detects whether the acquired brightness of the ambient light is less than the brightness threshold.

When the brightness of the ambient light is less than the brightness threshold, the method 200 proceeds to operation in block 203.

When the brightness of the ambient light is greater than the brightness threshold, the method 200 proceeds to operation in block 201 again.

At block 203, when the brightness of the ambient light is less than the brightness threshold, an acceleration vector of gravity is obtained by an acceleration sensor.

Figure 3:
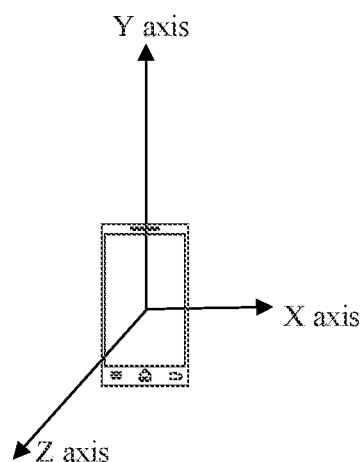
FIG. 3 illustrates a schematic diagram of a coordinate system for a body of a terminal according to an exemplary embodiment.

For example, the acceleration sensor corresponds to a three-dimensional space coordinate system, and the three-dimensional space coordinate system has three coordinate axes including an X axis, a Y axis, and a Z axis. As an example, when the body of the terminal is in a vertical posture, the position of the acceleration sensor is taken as an origin, the horizontal right direction is taken as a positive X-axis, and the vertical upward direction is taken as a positive Y-axis, the direction which is perpendicular to the XY plane and which is towards the front is taken as a positive Z-axis, as illustrated in FIG. 3, This three-dimensional space coordinate system is also referred to as a coordinate system for the body of the terminal. It is to be noted that the manner in which the coordinate system for the body is established is not united.

Also for example, the acceleration sensor is configured to detect an acceleration of gravity, and calculate an acceleration vector of gravity in the coordinate system for the body according to the components of the acceleration of gravity on the three coordinate axes.

At block 204, it is detected whether an angle between the acceleration vector of gravity and a predetermined coordinate axis is less than an angle threshold.

For example, the predetermined coordinate axis may be a coordinate axis corresponding to a vertically upward direction in the terminal. As an example, referring to FIG. 3, the predetermined coordinate axis is the positive Y-axis.

Also for example, the angle threshold is used to tolerate errors. The angle threshold can be ±15°, or can also be ±30°.

The terminal detects whether the angle between the acceleration vector of gravity and the predetermined coordinate axis in the coordinate system for the body of the terminal is less than the angle threshold. When the angle is less than angle threshold, the method 200 proceeds to operation in block 205. When the angle is not less than the angle threshold, the method 200 proceeds to operation in block 203 again.

At block 205, it is determined that a body posture of the terminal is an inverted posture when the angle between the acceleration vector of gravity and the predetermined coordinate axis in the coordinate system for the body of the terminal is less than the angle threshold.

Since the acceleration vector of gravity is directed directly to the top of the terminal, it is determined that the body posture of the terminal is the inverted posture.

At block 206, a duration during which the body posture of the terminal is the inverted posture is timed.

For example, for the purpose of reducing false detections, the terminal may also set a timer, and the timer is used to time a duration during which the body posture of the terminal is the inverted posture.

At block 207, a touch-disable mode is activated when the duration exceeds a duration threshold.

The terminal activates the touch-disable mode when the duration timed by the timer exceeds a duration threshold. The touch-disable mode includes that a predetermined component is set to a non-operating state; or when receiving a signal reported by a predetermined component, the terminal does not respond to the signal.

In the exemplary embodiment, the predetermined component includes at least one of a physical button, a virtual button, a fingerprint sensor, a pressure sensor, an edge touch sensor, a touch display screen, or a camera.

In the method 200, when the brightness of the ambient light is less than the brightness threshold and the body posture of the terminal is an inverted posture, it is determined that the terminal is in a pocket of a user and the touch-disable mode is activated. Thus, when no distance sensor is provided in the terminal, a light sensor and an acceleration sensor in the terminal are used to recognize a pocket scene accurately and the touch-disable mode is activated accurately.

In the method 200, it is detected whether the terminal is located in a pocket when the terminal is in an off-screen state, so that the energy consumption of the terminal can be reduced.

In the method 200, it is determined whether the terminal is in an inverted posture according to the acceleration vector of gravity that is obtained by the acceleration sensor, so that the body posture of the terminal can be detected by using an algorithm with a small amount of calculations.

In the method 200, the duration during which the terminal is in the inverted posture is timed by the timer, and it is determined that the touch-disable mode is activated if the duration reaches the predetermined threshold, so that the false detection can be reduced.

It is to be noted that when the terminal is not in the pocket of the user, the probability that the environment is dark and the terminal is in an inverted posture is very small. Therefore, the method 200 provides a high detection accuracy and can accurately activate the touch-disable mode.

Figure 4:
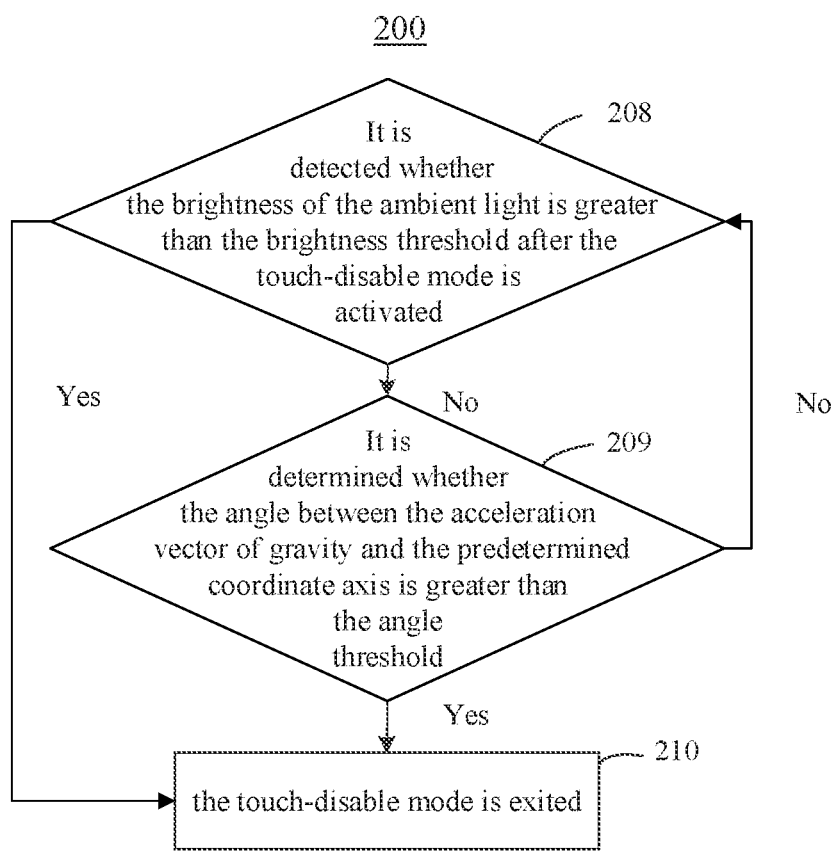
FIG. 4 illustrates a flowchart of a method for preventing a terminal from being inadvertently touched according to another exemplary embodiment.

In another exemplary embodiment, after operation in block 207, the following operations are further included, as illustrated in FIG. 4.

At block 208, it is detected whether the brightness of the ambient light is greater than the brightness threshold after the touch-disable mode is activated.

For example, it is detected whether the brightness of the ambient light is greater than the brightness threshold every predetermined time interval, after the touch-disable mode is activated.

If the brightness of the ambient light is greater than the brightness threshold, the method 200 proceeds to operation in block 210.

If the brightness of the ambient light is not greater than the brightness threshold, the method 200 proceeds to operation in block 209.

At block 209, it is determined whether the angle between the acceleration vector of gravity and the predetermined coordinate axis is greater than the angle threshold.

If the angle is greater than the angle threshold, it proceeds to operation in block 210.

If the angle is not greater than the angle threshold, the method 200 proceeds to operation in block 208 again.

At block 210, the touch-disable mode is exited.

The terminal exits the touch-disable mode. The operation of exiting the touch-disable mode includes that a predetermined component is set to an operating state; or when receiving a signal reported by a predetermined component, the terminal responds to the signal.

In the exemplary embodiment, the predetermined component includes at least one of a physical button, a virtual button, a fingerprint sensor, a pressure sensor, an edge touch sensor, a touch display screen, or a camera.

In the method 200, the terminal can exit the touch-disable mode in time when the terminal is outside the pocket, so as to avoid affecting the normal operation of the terminal by the user.

It is noted that the order of execution of operations in blocks 208 and 209 may be interchanged.

The following is an embodiment of a device of the present disclosure, which may be used to implement the embodiments of the method of the present disclosure.

Figure 5:
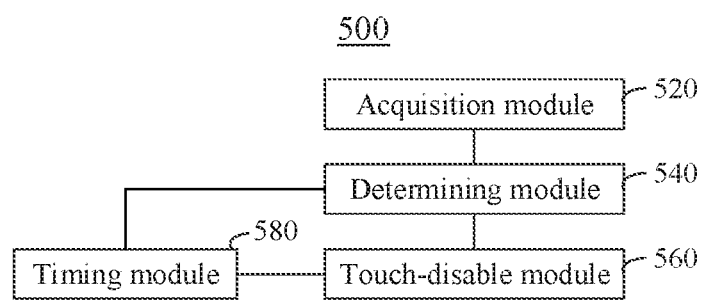
FIG. 5 illustrates a block diagram of a device for preventing a terminal from being inadvertently touched according to an exemplar embodiment.

FIG. 5 illustrates a block diagram of a device 500 for preventing a terminal from being inadvertently touched according to an exemplary embodiment. As illustrated in FIG. 5, the device 500 is for use in a terminal. The terminal may include a light sensor and an acceleration sensor. The device 500 may include, but is not limited to, an acquisition module 520, a determining module 540, and a touch-disable module 560.

The acquisition module 520 is configured to acquire brightness of ambient light. The determining module 540 is configured to determine a body posture of the terminal when the brightness of the ambient light is less than a brightness threshold. The touch-disable module 560 is configured to activate a touch-disable mode when the body posture of the terminal is an inverted posture.

In an exemplary embodiment, the determining module 540 may be configured to obtain an acceleration vector of gravity by an accelerator sensor, and to determine that the body posture of the terminal is the inverted posture when an angle between the acceleration vector of gravity and a predetermined coordinate axis in a coordinate system for a body of the terminal is less than an angle threshold.

In the exemplary embodiment, the predetermined coordinate axis is a coordinate axis directed to a top direction of the terminal.

In an exemplary embodiment, the device 500 may further include a timing module 580. The timing module 580 is configured to time a duration during which the body posture of the terminal is the inverted posture. The touch-disable module 560 is configured to activate the touch-disable mode when the duration exceeds a duration threshold.

In an exemplary embodiment, the acquisition module 520 may be configured to acquire the brightness of the ambient light when a screen of the terminal is in an off-screen state.

In an exemplary embodiment, the acquisition module 520 may be configured to acquire the brightness of the ambient light by a light sensor; or the acquisition module 520 may be configured to acquire the brightness of the ambient light by a camera.

In an exemplary embodiment, the touch-disable module 560 may be configured to set a predetermined component to a non-operating state; or to make no response to a signal received from a predetermined component.

In the exemplary embodiment, the predetermined component may include at least one of a physical button, a virtual button, a fingerprint sensor, a pressure sensor, an edge touch sensor, a touch display screen, or a camera.

In an exemplary embodiment, the touch-disable module 560 is further configured to exit the touch-disable mode ashen at least one of the following occurs: the brightness of the ambient light is greater than the brightness threshold, or the angle is greater than the angle threshold.

The specific manners in which each module in the device 500 operates has been described in the related method embodiments, details will not be described herein again.

In an exemplary embodiment of the present disclosure, there is provided a device for implementing the above described methods for preventing a terminal from being inadvertently touched. The device includes a processor and a memory configured to store an instruction executable by the processor. The processor is configured to acquire brightness of ambient light; determine a body posture of the terminal when the brightness of the ambient light is less than a brightness threshold; and activate a touch-disable mode when the body posture of the terminal is an inverted posture.

Figure 6:
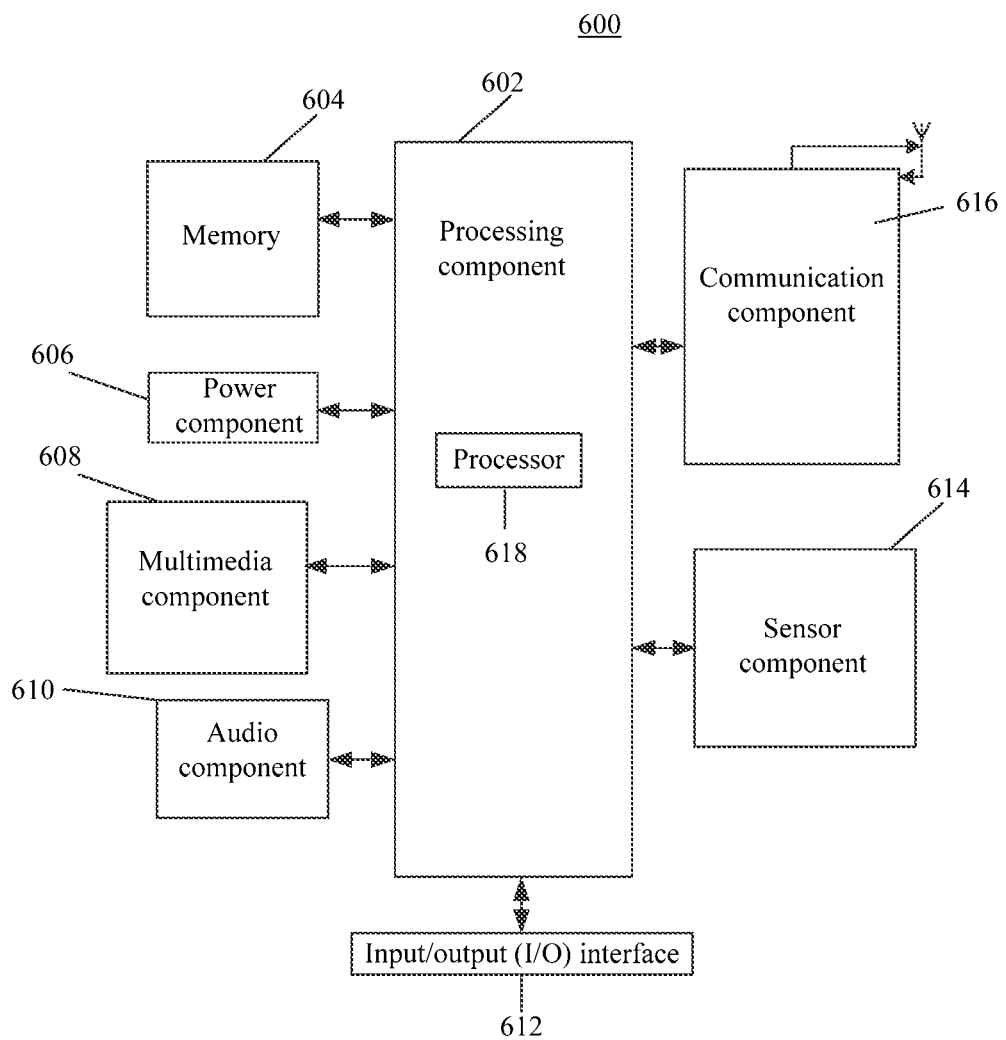
FIG. 6 illustrates a block diagram of a device according to an exemplary embodiment.

FIG. 6 illustrates a block diagram of a device 600 according to an exemplary embodiment. For example, the device 600 may be a mobile phone, a computer, a digital broadcast terminal, a message transceiver device, a gaining console, a tablet device, a medical device, a fitness device, and a personal digital assistant, and the like.

Referring to FIG. 6, the device 600 may include one or more of a processing component 602, a memory 604, a power component 606, a multimedia component 608, an audio component 610, an input/output (I/O) interface 612, a sensor component 614, or a communication component 616.

The processing component 602 typically controls overall operations of the device 600, such as the operations associated with display, telephone calls, data communications, camera operations, and recording operations. The processing component 602 may include one or more processors 618 to execute instructions to perform all or part of the operations in the above described methods. Moreover, the processing component 602 may include one or more modules which facilitate interaction between the processing component 602 and the other components. For instance, the processing component 602 may include a multimedia module to facilitate interaction between the multimedia component 608 and the processing component 602.

The memory 604 is configured to store various types of data to support the operations of the device 600. Examples of such data include instructions for any application programs or methods operated on the device 600, contact data, phonebook data, messages, pictures, video, etc. The memory 604 may be implemented by any type of volatile or non-volatile memory devices, or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk.

The power component 606 provides power for various components of the device 600. The power component 606 may include a power management system, one or more power supplies, and other components associated with the generation, management and distribution of power for the device 600.

The multimedia component 608 includes a screen providing an output interface between the device 600 and a user. In some embodiments, the screen may include a Liquid Crystal Display (LCD) and a Touch Panel (TP). If the screen includes the TP, the screen may be implemented as a touch screen to receive an input signal from the user. The TP includes one or more touch sensors to sense touches, swipes and gestures on the TP. The touch sensors may not only sense a boundary of a touch or swipe action, but also sense a duration and pressure associated with the touch or swipe action. In some embodiments, the multimedia component 608 includes at least one of a front camera or a rear camera. At least one of the front camera or the rear camera may receive external multimedia data when the device 600 is in an operation mode, such as a photographing mode or a video mode. Each of the front camera and the rear camera may be a fixed optical lens system or have focusing and optical zooming capabilities.

The audio component 610 is configured to output and/or input an audio signal. For example, the audio component 610 includes a microphone (MIC), and the MIC is configured to receive an external audio signal when the device 600 is in the operation mode, such as a call mode, a recording mode and a voice recognition mode. The received audio signal may be further stored in the memory 604 or sent through the communication component 616. In some embodiments, the audio component 610 further includes a speaker configured to output the audio signal.

The I/O interface 612 provides an interface between the processing component 602 and a peripheral interface module, and the peripheral interface module may be a keyboard, a click wheel, a button and the like. The button may include, but not limited to, a home button, a volume button, a starting button and a locking button.

The sensor component 614 includes one or more sensors configured to provide status assessment in various aspects for the device 600. For instance, the sensor component 614 may detect an on/off status of the device 600 and relative positioning of components, such as the components may be a display and small keyboard of the device 600, and the sensor component 614 may further detect a change in a position of the device 600 or a component of the device 600, presence or absence of contact between the user and the device 600, orientation or acceleration/deceleration of the device 600 and a change in temperature of the device 600. The sensor component 614 may include a proximity sensor configured to detect presence of an object nearby without any physical contact. The sensor component 614 may also include a light sensor, such as a Complementary Metal Oxide Semiconductor (CMOS) or Charge Coupled Device (CCD) image sensor configured for use in an imaging application. In some embodiments, the sensor component 614 may also include an acceleration sensor, a gyroscope sensor, a magnetic sensor, a pressure sensor or a temperature sensor.

The communication component 616 is configured to facilitate wired or wireless communication between the device 600 and another device. The device 600 may access a communication-standard-based wireless network, such as a Wireless Fidelity (Wi-Fi) network, a 2nd-Generation (2G) or 3rd-Generation (3G) network or a combination thereof. In an exemplary embodiment, the communication component 616 receives a broadcast signal or broadcast associated information from an external broadcast management system through a broadcast channel. In an exemplary embodiment, the communication component 616 further includes a Near Field Communication (NFC) module to facilitate short-range communication. For example, the NFC module may be implemented on the basis of a Radio Frequency Identification (RFID) technology, an Infrared Data Association (IrDA) technology, an Ultra-WideBand (UWB) technology, a BT technology and another technology.

In an exemplary embodiment, the device 600 may be implemented by one or more Application Specific Integrated Circuits (ASICs). Digital Signal Processors (DSPs), Digital Signal Processing Devices (DSPDs), Programmable Logic Devices (PLDs), Field Programmable Gate Arrays (FPGAs), controllers, micro-controllers, microprocessors or other electronic components, and is configured to execute the abovementioned method for preventing a terminal from being inadvertently touched.

In an exemplary embodiment, there is also provided a non-transitory computer readable storage medium including an instruction, such as the memory 604 including an instruction, and the instruction may be executed by the processor 618 of the device 600 to implement the above described methods for preventing a terminal from being inadvertently touched. For example, the non-transitory computer-readable storage medium may be a ROM, a Random Access Memory (RAM), a Compact Disc Read-Only Memory (CD-ROM), a magnetic tape, a floppy disc, an optical data storage device and the like.

Other embodiments of the present disclosure will be apparent to those skilled in the art from consideration of the specification and practice of the present disclosure. The application is intended to cover any variations, uses, or adaptations of the present disclosure following the general principles thereof and including such departures from the present disclosure as come within known or customary practice in the art. It is intended that the specification and examples be considered as exemplary only, with a true scope and spirit of the present disclosure being indicated by the following claims.

It will be appreciated that the present disclosure is not limited to the exact construction that has been described above and illustrated in the accompanying drawings, and that various modifications and changes may be made without departing from the scope thereof. It is intended that the scope of the present disclosure only be limited by the appended claims.

What is claimed is:

1. A method for preventing a terminal from being inadvertently touched, comprising:
   acquiring brightness of ambient light;
   determining a body posture of the terminal when the brightness of the ambient light is less than a brightness threshold, wherein determining the body posture of the terminal comprises:
   obtaining, by an accelerator sensor, an acceleration vector of gravity; and
   determining that the body posture of the terminal is an inverted posture when an angle between the acceleration vector of gravity and a predetermined coordinate axis in a coordinate system for a body of the terminal is less than an angle threshold, wherein the predetermined coordinate axis is within a piano where the body of the terminal is located and directed to a top direction of the terminal; and
   activating a touch-disable mode when the body posture of the terminal is the inverted posture.

2. The method of claim 1, further comprising:
   before activating the touch-disable mode, timing a duration during which the body posture of the terminal is the inverted posture; and
   activating the touch-disable mode when the duration exceeds a duration threshold.

3. The method of claim 1, further comprising:
   acquiring the brightness of the ambient light when a screen of the terminal is in an off-screen state.

4. The method of claim 1, wherein acquiring the brightness of the ambient light comprises at least one of:
   acquiring, by a light sensor, the brightness of the ambient light; or
   acquiring, by a camera, the brightness of the ambient light.

5. The method of claim 1, wherein activating the touch-disable mode comprises at least one of:
   setting a predetermined component to a non-operating state; or
   when receiving a signal reported by the predetermined component, making no response to the signal;
   wherein the predetermined component comprises at least one of a physical button, a virtual button, a fingerprint sensor, a pressure sensor, an edge touch sensor, a touch display screen, or a camera.

6. The method of claim 1, further comprising:
   exiting the touch-disable mode when at least one of the following occurs: the brightness of the ambient light is greater than the brightness threshold, or the angle between the acceleration vector of gravity and the predetermined coordinate axis is greater than the angle threshold.

7. A device for preventing a terminal from being inadvertently touched, comprising:
   a processor; and
   a memory configured to store an instruction executable by the processor,
   wherein the processor is configured to:
   acquire brightness of ambient light;
   determine a body posture of the terminal when the brightness of the ambient light is less than a brightness threshold, wherein the body posture of the terminal is determined by:
   obtaining, by an accelerator sensor an acceleration vector of gravity; and
   determining that the body posture of the terminal is an inverted Posture when an angle between the acceleration vector of gravity and a predetermined coordinate axis in a coordinate system for a body of the terminal is less than an angle threshold, wherein the predetermined coordinate axis is within a plane where the body of the terminal is located, and directed to a top direction of the terminal; and
   activate a touch-disable mode when the body posture of the terminal is the inverted posture.

8. The device of claim 7, wherein the processor is further configured to:
   time a duration during which the body posture of the terminal is the inverted posture; and
   activate the touch-disable mode when the duration exceeds a duration threshold.

9. The device of claim 7, wherein the processor is further configured to acquire the brightness of the ambient light when a screen of the terminal is in an off-screen state.

10. The device of claim 7, wherein the processor Is further configured to perform at least one of: acquiring the brightness of the ambient light by a light sensor; or acquiring the brightness of the ambient light by a camera.

11. The device of claim 7, wherein the processor is further configured to perform at least one of: setting a predetermined component to a non-operating state; or making no response to a signal received from a predetermined component;
    wherein the predetermined component comprises at least one of a physical button, a virtual button, a fingerprint sensor, a pressure sensor, an edge touch sensor, a touch display screen, or a camera.

12. The device of claim 7, wherein the processor is further configured to exit the touch-disable mode when at least one of the following occurs: the brightness of the ambient light is greater than the brightness threshold, or the angle between the acceleration vector of gravity and the predetermined coordinate axis is greater than the angle threshold.

13. A non-transitory computer-readable storage medium having stored thereon at least one instruction that, when executed by a processor, cause the processor to perform a method for preventing a terminal from being inadvertently touched, the method comprising:
    acquiring brightness of ambient light;
    determining a body posture of the terminal when the brightness of the ambient light is less than a brightness threshold, wherein determining the body posture of the terminal comprises:
    obtaining, by an accelerator sensor, an acceleration vector of gravity; and determining that the body posture of the terminal is an inverted posture when an angle between the acceleration vector of gravity and a predetermined coordinate axis in a coordinate system for a body of the terminal is less than an angle threshold, wherein the predetermined coordinate axis is within a plane where the body of the terminal is located, and directed to a top direction of the terminal; and
activating a touch-disable mode when the body posture of the terminal is the inverted posture.

* * * * *